US010033604B2

United States Patent
Maes et al.

(10) Patent No.: US 10,033,604 B2
(45) Date of Patent: Jul. 24, 2018

(54) PROVIDING COMPLIANCE/MONITORING SERVICE BASED ON CONTENT OF A SERVICE CONTROLLER

(71) Applicant: Suse LLC, Wilmington, DE (US)

(72) Inventors: Stephane Herman Maes, Fremont, CA (US); Prashant Gupte, Castro Valley, CA (US)

(73) Assignee: Suse LLC, Wilmington, DE (US)

( * ) Notice: Subject to any disclaimer, the term of this patent is extended or adjusted under 35 U.S.C. 154(b) by 215 days.

(21) Appl. No.: 14/818,834

(22) Filed: Aug. 5, 2015

(65) Prior Publication Data

US 2017/0041206 A1 Feb. 9, 2017

(51) Int. Cl.
| | |
|---|---|
| *H04L 12/26* | (2006.01) |
| *H04L 12/24* | (2006.01) |
| *G06F 9/455* | (2018.01) |
| *H04L 29/06* | (2006.01) |
| *H04L 29/08* | (2006.01) |

(52) U.S. Cl.
CPC .......... *H04L 43/08* (2013.01); *G06F 9/45533* (2013.01); *G06F 9/45558* (2013.01); *H04L 41/5009* (2013.01); *H04L 41/5051* (2013.01); *H04L 41/5096* (2013.01); *H04L 63/00* (2013.01); *G06F 2009/45591* (2013.01); *H04L 67/10* (2013.01)

(58) Field of Classification Search
CPC ............. H04L 41/5009; H04L 41/5051; H04L 41/5096; H04L 43/08; H04L 63/00; H04L 67/10; H04L 12/26; H04L 29/08
USPC ................. 709/204, 205, 232, 224, 225, 235
See application file for complete search history.

(56) References Cited

U.S. PATENT DOCUMENTS

| | | |
|---|---|---|
| 2013/0014107 A1 | 1/2013 | Kirchhofer |
| 2013/0069950 A1 | 3/2013 | Florence et al. |
| 2013/0198050 A1 | 8/2013 | Shroff et al. |

(Continued)

FOREIGN PATENT DOCUMENTS

| | | |
|---|---|---|
| WO | WO-2012109633 A2 | 8/2012 |
| WO | WO-2014088537 | 6/2014 |

(Continued)

OTHER PUBLICATIONS

HP Live Network, "Cloud Service Automation (CSA)" Overview, https:hpln.hp.com/group/cloud-service-automation, downloaded Jul. 31, 2015, 3 pages.

(Continued)

*Primary Examiner* — David Lazaro
*Assistant Examiner* — Berhanu Shitayewoldetsadi
(74) *Attorney, Agent, or Firm* — Schwegman Lundberg & Woessner, P.A.

(57) ABSTRACT

In some examples, a service controller provisions an instance of a cloud service in response to receiving a request, where the service controller is provided with content including a call to be issued by the service controller to a compliance/monitoring service that performs a task selected from among monitoring the provisioned instance and determining compliance of the provisioned instance. The service controller issues the call to the compliance/monitoring service, the call including information regarding the provisioned instance, wherein the information is useable by the compliance/monitoring service in performing the task.

21 Claims, 3 Drawing Sheets

(56) References Cited

U.S. PATENT DOCUMENTS

| | | | | |
|---|---|---|---|---|
| 2014/0075016 A1* | 3/2014 | Chatterjee | ........... | H04L 41/5041 709/224 |
| 2014/0317413 A1 | 10/2014 | Deutsch et al. | | |
| 2015/0160989 A1 | 6/2015 | Maes et al. | | |
| 2015/0161681 A1 | 6/2015 | Maes et al. | | |
| 2015/0163179 A1 | 6/2015 | Maes et al. | | |
| 2015/0172321 A1* | 6/2015 | Kirti | ................... | H04L 63/1416 726/1 |
| 2015/0195303 A1* | 7/2015 | Holden | ............... | H04L 63/1458 709/229 |
| 2015/0304240 A1* | 10/2015 | Mandaleeka | ......... | G06F 9/5072 709/226 |

FOREIGN PATENT DOCUMENTS

| | | |
|---|---|---|
| WO | WO-2015065350 | 5/2015 |
| WO | WO-2015065353 | 5/2015 |
| WO | WO-2015065355 | 5/2015 |
| WO | WO-2015065356 | 5/2015 |
| WO | WO-2015065359 | 5/2015 |
| WO | WO-2015065368 | 5/2015 |
| WO | WO-2015065370 | 5/2015 |
| WO | WO-2015065374 | 5/2015 |
| WO | WO-2015065382 | 5/2015 |
| WO | WO-2015065389 | 5/2015 |
| WO | WO-2015065392 | 5/2015 |

OTHER PUBLICATIONS

HP Live Network, Cloud Service Automation (CSA), Announcing CSA 4.5 release, https://hpln.hp.com/node25762, submitted by Patrick Deloulay, Jul. 9, 2015, 2 pages.
hp.com, "Announcing HP Codar: Your New DevOps Secret weapon to automate application releases", Guest post by Roy Ritthaler, http:/h30499.www3.hp.com/15/Grounded-in-the-Cloud/Announcing-HP-Codar-Your-new-DevOps-secret-weapon-to-automate/ba-p6680261#Vb_HpflVhBc, downloaded Aug. 3, 2015, 3 pages.
Qualys, "Security & Compliance in the Cloud Age," (Research Paper), Sep. 2014, 15 pages.
Sullivan, D., "Application Monitoring Tools: Comparison of SaaS Solutions," (Research Paper), Mar. 18, 2014, 5 pages.

\* cited by examiner

PROVIDING COMPLIANCE/MONITORING SERVICE BASED ON CONTENT OF A SERVICE CONTROLLER

BACKGROUND

A cloud service generally refers to a service that allows end recipient computer systems (thin clients, portable computers, smart phones, desktop computers, and so forth) to access a pool of resources, such as processing resources, storage resources, and/or communication resources (collectively referred to as "cloud resources"). Such cloud resources are part of a cloud that is accessible by users. In this manner, the host (also referred to as a cloud service provider) may, as examples, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

In some examples, a cloud service may be a public service (an Internet-based service, for example) that is generally available to all potential users; such a cloud service is provided by a public cloud. In other examples, a cloud service can be a private service with restricted access that is provided over a private network (a business enterprise network, for example); such a cloud service is provided by a private cloud. In further examples, a cloud service can be a managed cloud service (e.g. on premise or hosted as a virtual private cloud service). Alternatively, a cloud service can be a hybrid cloud service (a cloud service that is a combination of the above).

BRIEF DESCRIPTION OF THE DRAWINGS

Some implementations are described with respect to the following figures.

DETAILED DESCRIPTION

A service controller can be used to provision an instance of a cloud service, and also to manage a lifecycle of the cloud service instance. A cloud service includes one or some combination of resources, such as processing resources, storage resources, network resources, and platform and application layers including machine-readable instructions (e.g. applications, protocol stacks, operating systems, a platform. etc.). Provisioning a cloud service can refer to creating the cloud service or otherwise making available the cloud service on demand (at the request of a user). In some examples, the request is a self-service request, where a user can select a design (or purchase/order a design presented as an offering in a catalog). A cloud service instance can be provisioned in response to the self-service request (selecting an item to be provisioned from a catalog in a catalog/marketplace portal and ordering after selecting all options). The terms "catalog" and "marketplace portal" are discussed further below. In other examples, the request can be activated programmatically using an application programming interface (API) that executes the equivalent of the ordering request in the self-service request implementations, to cause provisioning of a cloud service instance or to manage the cloud service instance. As multiple requests are received by the service controller, respective instances of cloud services can be provisioned. The cloud service can be provided by a public cloud, a private cloud, a managed cloud, or a hybrid cloud, or alternatively, can be provided using other infrastructure. In some examples, a cloud service instance can include an "application stack," which includes an application and a platform on which the application is executed, where the application and platform are provisioned using resources of a cloud (e.g. public cloud, private cloud, managed cloud, or hybrid cloud).

Lifecycle management of a cloud service instance can refer to actions to be performed on or for the cloud service instance as part of developing the cloud service, governing operation of the cloud service, performing maintenance of the cloud service, and any other actions that can be performed during the life of the cloud service. Examples include killing the cloud service (or components of the service), moving the cloud service (or components of the service), duplicating the cloud service (or components of the service), and so forth.

In the context of an information technology (IT) department, for example, as part of provisioning cloud service instances, it may be desirable to also provide further services, such as a compliance service to check that an instance of a cloud service satisfies one or multiple predefined criteria or policies. For example, the predefined criterion (or criteria) can include a security criterion (or security criteria) that relate(s) to a security of the cloud service instance. Such security criterion or criteria can be included in a security profile, which can include a security policy or a security level (e.g. level 1, level 2, etc.). In some examples, detailed security requirements can be associated with the security policy or the security level. In other examples, the predefined criterion (or criteria) can relate to government regulations, rules of an enterprise, service level goals, quality of service specifications, performance goals, usage goals, compliance goals, performance or usage metrics that are monitored to determine whether a performance or usage has become anomalous (e.g. excessive usage, low performance, etc.), and so forth. In some implementations, a compliance service can refer to a service to check for compliance of a provisioned cloud service instance with a security criterion (or security criteria), or to check for compliance of the provisioned cloud service instance with other criteria/policies. For some customers, provision of the foregoing services can be desirable to ensure that enterprise/corporate policies apply also to cloud service instances that are deployed in the cloud. Also, determining compliance with criteria/policies is useful in a public cloud or hybrid cloud to ensure that deployed cloud services satisfy appropriate requirements/policies or are secure enough.

The further services that can be provided as part of provisioning cloud service instances can additionally or alternatively include monitoring services, such as to monitor a performance metric of a cloud service instance (e.g. metrics relating to performance of a processor, metrics relating to network performance, metrics relating to performance of an application stack (e.g. infrastructure performance, application performance, service performance, etc.), a utilization metric of a cloud service instance (e.g. metrics relating to utilization of a processor, metrics relating to network utilization, metrics relating to utilization of an application (e.g. by a specific user versus a quota or cost, etc.), a behavior of the cloud service instance, and so forth. More generally, a monitoring service can monitor an operational aspect of the cloud service instance, where the operational aspect can include any or some combination of the performance metric, utilization metric, behavior, or any other aspect during operation of the cloud service instance.

The monitoring tasks of the monitoring service can also include detection of issues (e.g. faults, problems, overload conditions, etc.), followed by remediation of the detected issues, storing of history information regarding execution of the provisioned cloud service instance, and so forth. Alternatively or additionally, notification or reporting of the detected issues can be performed (such as if remediation cannot be automated and involves human intervention). A notification provides an indication of the issue, while a report can provide additional information about the issue, such as a log of activities, a log of fixes, a log of a number of issues, and so forth.

A service controller that is able to provision and then manage the lifecycle of cloud service instances may have to be modified to support understanding monitoring, security, or remediation policies and setting up the further services, including compliance services and/or monitoring services. Modifying the service controller can refer to modifying the code (machine-readable instructions) of the service controller. However, having to modify the service controller to support the further services can increase costs and development complexity of the service controller, since the service controller would have to be modified each time new further services are to be provided for interaction with the service controller.

In accordance with some implementations of the present disclosure, compliance and/or monitoring tasks provided by a service (hereinafter referred to as a "compliance/monitoring service") can be invoked without having to modify a service controller that is able to provision (and possibly then manage) cloud service instances in response to requests. An example of a service controller is a Cloud Service Automation (CSA) controller from Hewlett-Packard (HP), such as CSA Release 4.5. Although reference is made to the CSA controller as an example of a service controller, it is noted that other different service controllers can be employed in other implementations. When used by developers to automate release management and deployment suited for each development stage, the service controller can be a controller to manage and deploy releases of applications (or other machine-readable instructions), such as a CODAR Version 1.x from HP, or any other controller to manage and deploy releases of applications.

A compliance/monitoring service can refer to a service that performs one or some combination of the following: (1) a compliance task, which can include checking compliance of a provisioned cloud service instance with a security criterion (or security criteria) or with another type of criterion (or criteria), and (2) a monitoring task, which can include monitoring a performance, utilization, or behavior of a provisioned cloud service instance. In some examples, the compliance/monitoring service can also perform remediation and/or notification or reporting of issues as discussed above.

Rather than modify the service controller itself, content (also referred to as a "service design") associated with the service controller can be provided to support operation with the compliance/monitoring service. The content (or service design) can include sequences of machine-readable instructions (or workflows) to perform provisioning of a cloud service instance, and in some examples to perform lifecycle management actions for the cloud service instance. The workflows of the service design can be executed to provision or manage components that make up a cloud service, such as to perform a particular lifecycle management action. Some of the functions of the workflows defined by the service design can include provisioning actions and/or lifecycle management actions that are performed as calls to a resource provider. The resource provider converts the calls into well-formed and exchanged instructions specific to a particular resource or cloud service instance. A resource provider can be implemented using machine-readable instructions and is specific to a particular action or resource of a cloud.

The content (or service design) can also include information of a topology of the cloud service, where the topology can characterize capabilities of cloud resources in a cloud, APIs, and lifecycle management conditions related to lifecycle management actions.

In accordance with some implementations, a call (or calls) can be included in a service design that can be issued to the compliance/monitoring service to add the further services discussed above. In some examples, a resource provider is configured or changed to include the ability to convert a call from the service controller to the compliance/monitoring service (e.g. security service or other type of service as discussed above) into well-formed instructions provided to the compliance/monitoring service. A call can refer to any command, instruction, or indication (or a set of commands, a set of instructions, or a set of indications) that can be issued by the service controller to the compliance/monitoring service. For example, a call that the service controller can make can include a call to a routine of an API, a call to a library of routines, and so forth. The collection of items can also include configuration information for configuring an operation of the service controller, and other information.

The content (or service design) of the service controller is what the service controller acts upon or uses to provision and/or perform lifecycle management with respect to cloud service instances. By providing the content (or service design) to include a call to the compliance/monitoring service, the service controller is able to use the compliance/monitoring service even though the service controller is not designed to use the compliance/monitoring service. The service controller not being designed to use the compliance/monitoring service can refer to the code of the service controller not including any information or instructions to invoke the compliance/monitoring service.

By using techniques or mechanisms according to some implementations, users (e.g. developers, administrators, requester of a cloud service, etc.) are able to secure (or provide other compliance or monitoring service) for a deployed cloud service instance, without having to actually understand what is involved in doing so. The users can develop their own applications and select a compliance/monitoring service to deploy and can also select a level of security or other policy associated with the developed applications.

In addition, techniques or mechanisms according to some implementations can allow for remediation and/or notification or reporting of issues as discussed above. Examples of remediation tasks can include any or some combination of the following: change a setting of a virtual machine or computing node that is part of the deployed cloud service instance, install a patch to update an application, automatically interacting by the compliance/monitoring service with the cloud service instance, the compliance/monitoring service invoking a lifecycle management action exposed by the service design or by the cloud service instance, and so forth. In some examples, a remediation task can be performed by calling an API associated with lifecycle management of the deployed cloud service instance. In addition, if remediation cannot be performed, notification or reporting can be performed as discussed above.

Figure 1A:
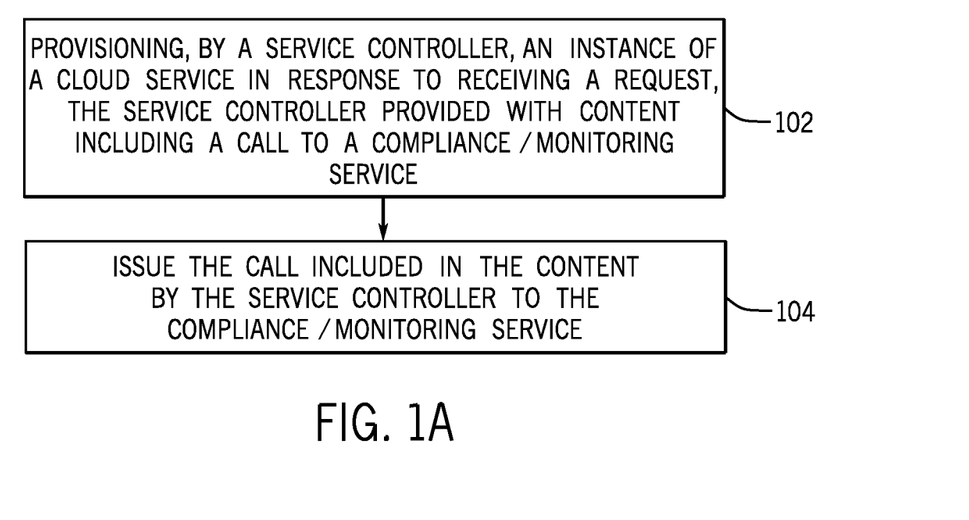
FIGS. 1A and 1B are flow diagrams of example processes according to some implementations.

FIG. 1A is a flow diagram of an example process according to some implementations. In the process of FIG. 1A, the service controller provisions (at 102) an instance of cloud service in response to receiving a request. The service controller is provided with content including a call to be issued by the service controller to a compliance/monitoring service as discussed above.

In some examples, the content that is provided can be built by a designer of the content. The content built by the designer can be received by a system that includes the service controller. The content includes a call (or multiple calls) to a compliance/monitoring service (or multiple compliance/monitoring services), where the call(s) can be explicitly included in the content, or alternatively, the content can include resource provider(s) that include(s) the call(s). In alternative examples, the content that is provided can be modified from original/previous content, where the original/previous content is modified by adding the call to the compliance/monitoring service.

After provisioning a cloud service instance, the service controller issues (at 104) the call (that is included in the content of the service controller) to the compliance/monitoring service to cause the compliance/monitoring service to perform a compliance task and/or a monitoring task. Additionally, the compliance/monitoring service can also perform remediation and/or notification or reporting as appropriate (as discussed above). The issued call includes information relating to the provisioned cloud service instance, as provisioned by the service controller. The issued call can additionally or alternatively include information relating to lifecycle management to be performed on an existing cloud service instance. The information relating to the provisioned cloud service instance or lifecycle management can include any or some combination of the following: addresses (e.g. Internet Protocol or IP addresses) of nodes (physical computing nodes or virtual machines) in the cloud service instance, ports of nodes in the cloud service instance, a topology of the cloud service instance, information relating to an operating system used by the cloud service instance, information of a type of node in the cloud service instance, information relating to virtual machines of the cloud service instance, a security level or any other policy about what is to be monitored (and how) and remediated (and how)] of the cloud service instance, a key or keys used to access data, an identifier of a tenant (either identifier of an individual user as tenant or an identifier of an organization as tenant), and so forth.

In some implementations of the present disclosure, the call that is issued (at 104) can be made after provisioning an entire cloud service instance or provisioning of each node of the cloud service instance that is to be monitored. Note also that a call can be issued after performing any lifecycle management action to either an entire cloud service instance or each node of the cloud service instance. In scenarios where a call is issued for each node of the cloud service instance, multiple calls can be issued.

In response to the call, the compliance/monitoring service can use the information in performing the compliance task and/or monitoring task (and any other task as discussed above).

It is noted that the process of FIG. 1A can be performed in the context where the compliance/monitoring service is a security service. The process of FIG. 1A can also be performed in any other compliance/monitoring contexts as discussed above on any other similar situations.

Figure 1B:
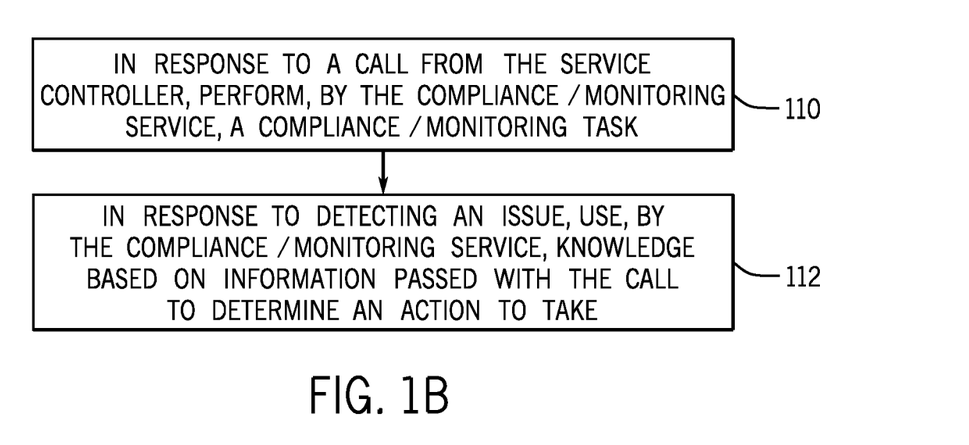

FIG. 1B is a flow diagram of an example process performed by the compliance/monitoring service according to some implementations. In response to a call from the service controller, the compliance/monitoring service performs (at 110) a compliance/monitoring task (as discussed above).

In response to detecting an issue based on the compliance/monitoring task (e.g. provisioned cloud service instance violates a security criterion or criteria in a security profile, the cloud service instance violates another compliance profile, metrics collected based on monitoring execution of the cloud service instance indicates a problem or other issue), the compliance/monitoring service can use knowledge about the cloud service instance (where the knowledge is based on the information passed with the call from the service controller as discussed above) and a policy passed also at that time to determine (at 112) an action to take. The action to take may involve interacting with the cloud service instance to perform changes for setting behavior. In addition, the compliance/monitoring service can also use its knowledge of APIs associated with lifecycle management to perform the action in response to the detected issue. For example, the compliance/monitoring service can remediate a problem. In addition or alternatively, the compliance/monitoring service can send a notification or report of the issue (e.g. the report can aggregate information of issues across multiple cloud service instances of a user or an organization). Moreover, in some examples, a notification or report can be sent in response to the compliance/monitoring service not being able to address (e.g. remediate) the detected issue. This can be especially useful when the issue cannot be automatically addressed. In such cases, a user can be notified to manually address the issue using the service controller or another tool. As further examples, the compliance/monitoring service can perform other actions, such as initiating the cloud service instance (when invoked for the first time), modifying the cloud service instance (such as in response to user modification of the cloud service instance or as part of remediating an issue), and so forth. In other examples, a notification and/or a report can be sent because a policy specifies that the notification and/or report should be sent regarding an issue.

Figure 2:
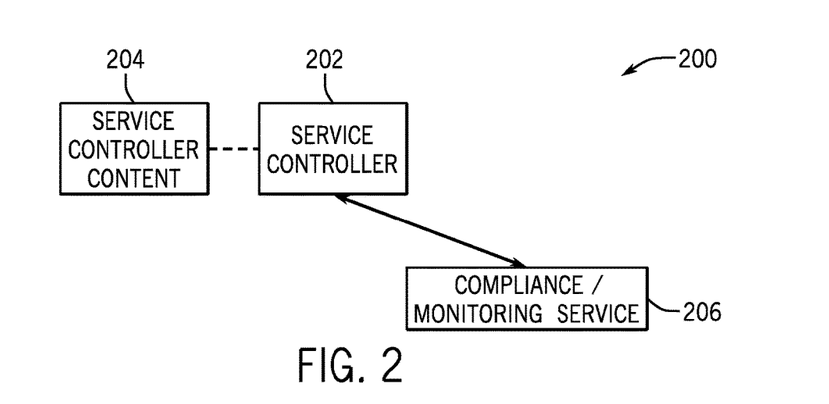
FIG. 2 is a block diagram of an example arrangement that includes a compliance/monitoring service and a service controller that is associated with service controller content, in accordance with some implementations.

FIG. 2 is a block diagram of an example system 200 according to some implementations. The system 200 can be part of a cloud infrastructure that includes cloud resources that are useable in response to requests of users to provide cloud services. In other examples, the system 200 can be separate from a cloud infrastructure that includes or supports cloud resources (e.g. 301 in FIG. 3); for example, the components of the system 200 can be implemented with Software-as-a-Service (SaaS) components, which are implemented as machine-readable instructions executable on one or multiple computer systems. The system 200 includes a service controller 202, which is able to receive a request for cloud service. The service controller 202 can be implemented using hardware (e.g. a computer, an arrangement of computers, a processor, an arrangement of processors, a processor core, an arrangement of processor cores, etc.). Alternatively, the service controller 202 can be implemented as a combination of hardware and machine-readable instructions executable by the hardware to perform operations of the service controller 202.

In response to the request (e.g. a request from a user to order the cloud service from a catalog or a request due to a call to an API triggered to fulfill or provision the cloud service), the service controller 202 can provision an instance of a cloud service, where the provisioned cloud service instance is configured according to the specifications made in the request. Examples of specifications made in the request can include a quality of service level, a processing capacity desired, a storage capacity desired, etc.

In FIG. 2, and also in FIG. 3 discussed further below, in some examples, the service controller 202 can call a resource provider, which in turn can call APIs to cloud resources (e.g. 301 in FIG. 3) to deploy a cloud service instance using the cloud resources. The call to the compliance monitoring service 206 can then occur after the entire cloud service instance is provisioned or modified, or after each node of the cloud service instance is provisioned or modified.

The service controller 202 is associated with service controller content 204, where such service controller content 204 can include the content (or service design) discussed further above. In some examples, the service controller content 204 can be part of a catalog. A catalog can include catalog items, where each catalog item can include a collection of information that describes characteristics of a respective cloud service (or cloud services), as well as other metadata related to the cloud service(s). The catalog can have a predetermined format, and can include one or multiple documents that contain the corresponding information relating to the cloud service(s). The information describing characteristics of an offering (a cloud service) in a catalog can describe features of the offering. Items in the catalog can be ordered by a user or can be requested through an API call.

The metadata of the catalog can also specify information regarding how the offering(s) of the catalog is to be presented in a portal (that presents a user interface)—the user interface presented by the portal is how customers can view the offering(s). The portal can also be referred to as a "marketplace portal." In addition, the metadata can include one or more of the following: information about an interface, such as an API relating to the offering(s), information about how to manage the offering(s), information about what to display in a graphical user interface (GUI). prices of offerings, terms associated with offerings, who can order, and so forth.

In some examples, the service controller content 204 can be provided in the catalog following the items (and associated metadata) in the catalog. Alternatively, pointers or other references to the service controller content 204 can be included in the catalog. By including the service controller content 204 in the catalog or by including references to the service controller content 204 in the catalog, the service controller 202 can use such service controller content 204 to provision cloud service instances or to perform lifecycle management actions. In the present discussion, reference is made to service controller content of the service controller 202; such service controller content can refer to service controller content that is external of (but accessible) by the service controller 202, or alternatively, such service controller content can be stored in a storage medium of the service controller 202.

During use, a user can select the service design from the catalog to apply for use in the provisioning or lifecycle management of a cloud service instance. The catalog can include several different service designs from which the user can make a selection.

As discussed above, the service controller content 204 can include a call that can be issued by the service controller 202 to a compliance/monitoring service 206. The call can be issued by the service controller 202 to the compliance/monitoring service 206 in response to provisioning of a cloud service instance by the service controller 202 or as part of performing lifecycle management of the cloud service instance (performed on 301 in FIG. 3, for example). The call that is issued by the service controller 202 to the compliance/monitoring service 206 can include information useable by the compliance/monitoring service 206 to perform a compliance task and/or a monitoring task. As further discussed above, the compliance/monitoring service 206 can also perform remediation and/or reporting or notification.

In some examples, the compliance/monitoring service 206 can be provided as a SaaS tool that can be invoked on demand to perform a desired task during provisioning of a cloud service instance. In other examples, the compliance/monitoring service 206 can be implemented as hardware or a combination of hardware and machine-readable instructions. As further examples, the compliance/monitoring service 206 can also be on premise (of an organization), can be embedded within the service controller 202, can be provided along with the service controller 202, can be provided in a distributed arrangement with the service controller 202, and so forth.

In some examples, the compliance/monitoring service 206 can be a security service. In response to the call that includes the information of the provisioned cloud service instance, the security service can perform a security check task. As an example, the call can be an API call according to the Representational State Transfer (REST) protocol; in other examples, the call can be according to other protocols. For example, the information relating to the provisioned cloud service instance that is provided with the API call can include any or some combination of various information as listed above. Generally, information of the provisioned cloud service instance can include configuration information describing the provisioned cloud service instance. The configuration information can be about the topology of the whole cloud service instance or about a node of the cloud service instance, and possibly about how neighboring nodes are positioned with respect to each other, such as a topology of the neighboring nodes, and/or relationships between the nodes.

Using the information relating to the provisioned cloud service instance, the security service can determine whether the provisioned cloud service instance (as provisioned by the service controller 202) is compliant with one or multiple security criteria. Note that the security criterion (or security criteria) can be included in a security profiles. Multiple security profiles can be provided to define different security criteria.

During use in implementations of security monitoring and remediation, a profile (e.g. security profile or other type of profile) can be associated with a service design using one of several different options. According to a first option, a profile can be associated with the service design at the design time of the service design. For example, a designer (of the service design) can specify the profile (or profiles) to be associated with the service design.

According to a second option, a profile can be associated with a catalog. For example, an administrator can set up the profile for a cloud service instance or offering in the catalog so that the profile is automatically selected, and thus is not an option left to the user to select when ordering. As examples, an administrator may decide that a particular service should have a high or medium security level. As another example, the profile can be a default for a user; the user may be able to select another profile if desired.

According to a third option, a profile can be selected by a user who orders an offering. The user can be presented with a number security profiles, and the user can select which of the security profiles to apply when provisioning or managing a cloud service instance.

According to a fourth option, a profile can be passed with an API call when provisioning the cloud service instance—this profile can then be associated with the cloud service instance and can be used as life cycle management changes are made.

In some examples, if the provisioned cloud service instance is compliant with the security criterion (or security criteria), then the compliance/monitoring service 206 can provide an indication that provisioned cloud service instance is compliant, and the service controller can continue to deploy the cloud service instance in response to such indication.

On the other hand, if the security service determines that the provisioned cloud service instance does not comply with the one or multiple security criteria, then the security service can send an indication of the non-compliance to the service controller 202, which can take action, such as to perform a remediation as discussed above. The security service can also provide notification of non-compliance to a target entity, such as a user, an administrator, an application, or other entity (e.g. to have the target entity perform remediation), or the security service can generate reports on logs of discoveries and fixes as well as issues.

In further examples, in response to provisioning or modifying a cloud service instance, a call is passed to the compliance/monitoring service, and the compliance/monitoring service checks and determines if compliant or not. If compliant, then nothing has to be done, or a notification or report can be sent to the service controller. However, if not compliant, then a determination can be made of what to do, such as performing a fix by interacting with the cloud service instance, by using a life cycle management API, or sending a notification or report, or some combination of the foregoing.

In the foregoing, it is assumed that the compliance/monitoring service 206 is called by the service controller 202 after provisioning of a cloud service instance. In other examples where the compliance/monitoring service 206 is called before provisioning of a cloud service instance, a detection of an issue (such as violation of a security policy) can cause the service controller to deny the request for the provisioning of the cloud service instance.

In other examples, instead of determining compliance with a security criterion (or security criteria), the compliance/monitoring service 206 can determine compliance of the provisioned cloud service instance with other compliance criteria, such as rules, regulations, policies, and so forth.

In further examples, the compliance/monitoring service 206 can perform monitoring of the provisioned cloud service instance during operation of the provisioned cloud service instance. The compliance/monitoring service 206 can provide monitored information to a target entity, such as the service controller 202 or some other entity. The monitoring can monitor performance of a cloud service instance during operation, usage of the cloud service instance (e.g. how much is used and by whom, such as with usage metrics, information about security attacks, logs, results of analytics of metrics, etc.), and so forth.

Figure 3:
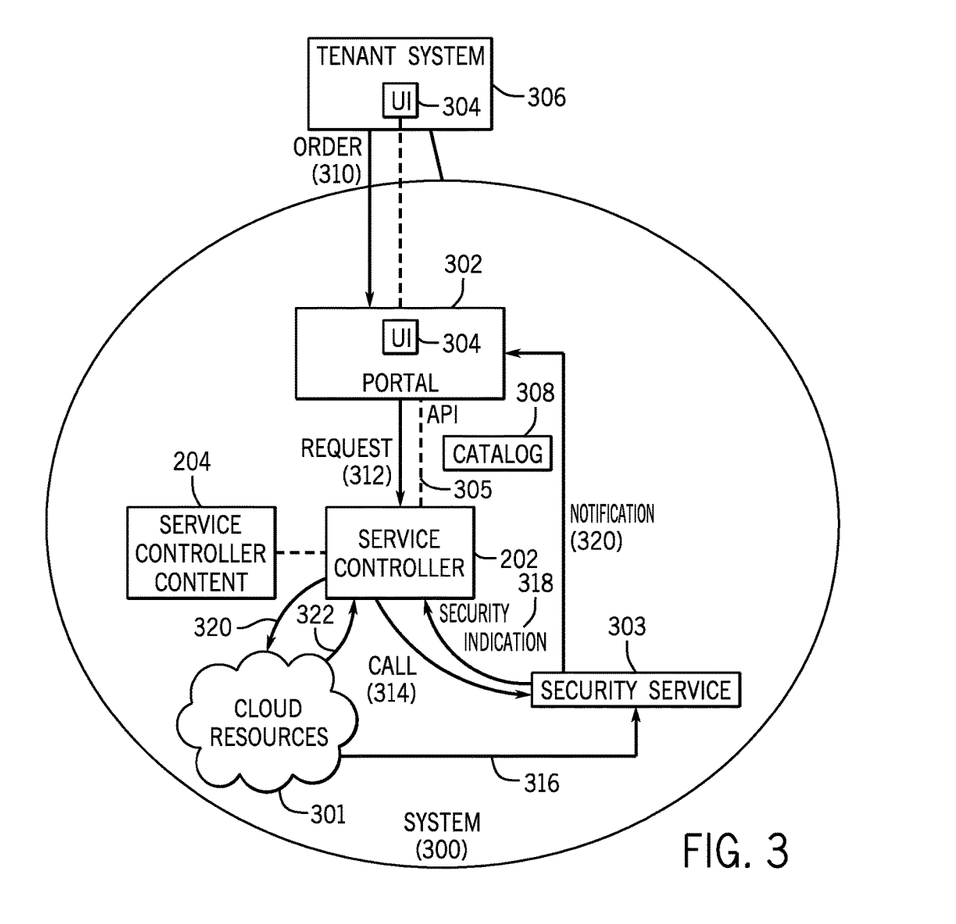
FIG. 3 is a block diagram of an example arrangement, according to some implementations.

FIG. 3 is a block diagram of an example arrangement that includes a system 300. The system 300 includes cloud resources 301 (e.g. processor resources, storage resources, communication resources, application resources, etc.) that are useable on demand by tenants of a cloud including the cloud resources 301. A tenant of a cloud can refer to an organization (with one or multiple users) or to an individual user who is able to request provisioning of a cloud service including a portion cloud resources 301. More generally, different tenants of a cloud can refer to respective different users who in turn have their own users.

The system 300 can include a collection of tools, such as a portal 302, the service controller 202, and a security service 303. The service controller 202 can perform an action (320) with respect to the cloud resources 301, where the action (302) can include provisioning a cloud service instance and/or performing a lifecycle management action. Information (322) about the cloud service instance can be provided from the cloud resources 301 to the service controller 202. Information (316) about the cloud service instance can additionally or alternatively be provided from the cloud resources 301 to the security service 303.

The portal 302 can be implemented as hardware or a combination of machine-readable instructions and hardware. As depicted in FIG. 3, an API 305 is provided between the portal 302 and the service controller 220. Generally, the portal 302 allows for interaction between tenants (users) of the cloud, and a control component (e.g. the service controller 202) of the cloud. In some examples, the portal 302 can present a user interface 304 that can be displayed by a browser or other application at a tenant system 306 of the user. The tenant system 306 can include any of the following: a desktop computer, a notebook computer, a tablet computer, a smartphone, and so forth. Using the user interface 304, the user can submit an order for a cloud service to the service controller 202.

In some implementations, the portal 302 can access a catalog 308 including information relating to various cloud services that can be provisioned by the service controller 202. Using the information of the catalog, the portal 302 is able to present a list of cloud services to the user using the user interface 304. In other examples, an order can be performed using an API call.

The catalog 308 can also include security profiles (including security policies or security levels) including respective different security criteria. The security profiles can also be presented to the user in the user interface 304. The user is able to select from among the security profiles that the user wishes a provisioned cloud service instance to be compliant with. The foregoing is an example of the third option discussed above for associating a profile with a service design. Other options (e.g. first, second, or fourth option) can also be used. As shown in FIG. 3, the security service 303 can be invoked by the service controller 202 to perform a security task when provisioning a requested cloud service instance.

The security service 303 is an example of the compliance/monitoring service 206 depicted in FIG. 2. The security service 303 can be replaced with another service in other examples.

In other examples, instead of including security profiles in the catalog 308 from which the user can select when placing an order for a cloud service, one security profile can be predefined for the user (such as by an administrator in the catalog or by a designer in the service design). Alternatively, the security profile can be passed with an API call associated with the service design to provision a cloud service instance.

Although the security service 303 and/or the service controller 202 are depicted as being part of the system 300 that also includes cloud resources 301 in some examples, it is noted that the security service 303 and/or service controller 202 can be external of the system 300 in other examples, such as in another domain, another cloud, on premise, offered as a SaaS tool, and so forth. Note also that the service controller 202 and the service controller 202 and the security service 303 can be part of separate systems.

In response to receiving an order (310) for a cloud service from the user at the tenant system 306, the portal 302 can submit a request (312) to the service controller 202 to provision a cloud service instance 306 to provide the ordered cloud service. In this use case the security level (e.g. policy) can have been preselected at design or by an administrator in a catalog or it may have been offered as option to the user who can select say the security level to use.

In response to the request (312), the service controller 202 performs tasks to provision a cloud service instance. Alternatively or additionally, the service controller 202 can also perform a lifecycle management action or can modify the cloud service instance. The provisioned cloud service instance includes resources selected from the cloud resources 301, where the selected resources are based on the type of cloud service requested—e.g. cloud service to store data, cloud service to execute an application, cloud service to perform processing functions, etc.

Information of the cloud service instance being provisioned is gathered by the service controller 202. As noted above, such information can include addresses of nodes in the cloud service instance, ports of nodes in the cloud service instance, a topology of the cloud service instance, information relating to virtual machines of the cloud service instance, a security level of the provisioned cloud service instance, a key or keys used to access data, and so forth.

The service controller 202 then issues a call (314) to the security service 303, where the issued call includes information regarding the provisioned cloud service instance 306. In some implementations, the information can also include information about a policy (e.g. security policy or security level) as well as an identifier of the tenant (either identifier of an individual user as tenant or an identifier of an organization as tenant). Moreover, the information can include a credential of the user to allow access of the cloud service, and even modification of cloud service instance to perform remediation on behalf of the tenant]. As noted above, the call (314) is part of the content 204 that is associated with the service controller 202. The information regarding the provisioned cloud service instance can include the information of the provisioned cloud service instance, or alternatively, a pointer or other reference to a storage location that stores the information of the provisioned cloud service.

In an example where the call (306) provided to the security service 303 includes a pointer or other reference, the security service 303 uses this pointer or other reference to retrieve the information (316) of the provisioned cloud service instance.

In other examples, the information of the provisioned cloud service instance can be provided from the service controller 202 to the security service 303 with the call (314).

The security service 303 can perform a security task based on the information of the provisioned cloud service instance obtained by the security service 303. The security service 303 can send a security indication (318) to the service controller 202 regarding whether the provisioned cloud service instance is compliant with the security criterion (or security criteria) of the selected security profile.

In some implementations, the user at the tenant system 306 can also make a selection, in the user interface 304, to receive notification regarding whether or not the provisioned cloud service instance is compliant with the selected security profile. In such case, the security service 303 can send a notification (320) to the portal 302. The notification (320) can include an indication of whether or not the provisioned cloud service instance is compliant with the selected security profile. The indication can be presented to the user in the user interface 304, such as in a dialog box (e.g. in a graphical user interface screen) or by some other mechanism.

Also, the security service 303 can provide an indication of whether or not the provisioned cloud service instance 306 complies with the security criterion or criteria, back to the service controller 202.

Also, the security service 303 can send a report (e.g. of logs, fixes, issues etc.) to the portal 302 (or any other target application, location, etc.). In addition, the portal 302 can be used by a user to modify a cloud service instance, and execution of the cloud service instance can continue after modification. In response to user modification of the cloud service instance, the security service 303 and/or the service controller 302 can modify the cloud service instance. After modification of the cloud service instance, information about details of the modified cloud service instance can be passed to the security service 303 for further monitoring and/or remediation.

Using techniques or mechanisms according to some implementations, the security service 303 (or more generally the compliance/monitoring service 206 of FIG. 2) can be provided as an add-on service to a system such as a cloud system (public cloud system or private cloud system), without having to modify code of a service controller that provisions cloud service instances in response to user requests, or having to add support for the service in another control component of the cloud system.

Figure 4:
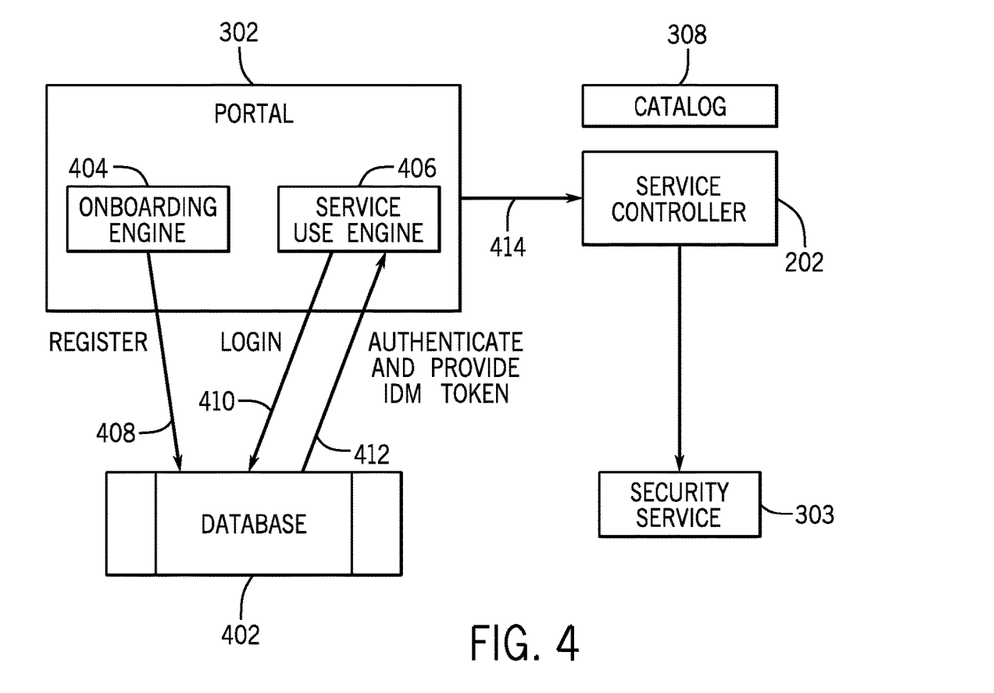
FIG. 4 is a block diagram of an example arrangement for onboarding a user, according to some implementations.

FIG. 4 is a block diagram of an example arrangement that includes the portal 302, a database 402, the service controller 202, and the security service 303. In some examples, the database 402 can include a Lightweight Directory Access Protocol (LDAP) database, to allow "onboarding" of users (tenants or individual users) to allow the users to use the service controller 202 and the security service 303 (or more generally the compliance/monitoring service 206 of FIG. 2). In other examples, the database 402 can be according to a different protocol.

An onboarding operation can refer generally to an operation that adds a user or a tenant that has a set of users to a system to allow the user or tenant to use resources of the system. The portal 302 can include an onboarding engine 404, which can present an onboarding UI to a tenant system (e.g. 306 in FIG. 3). The onboarding UI provides control elements to enable the user to perform onboarding with respect to the service controller 202 and the security service 303.

A user or administrator can make control selections in the onboarding UI to register (408) the user with the system, which updates the database 402. An individual user can be registered, or an organization (e.g. company, university, government agency, etc.) can be registered as a tenant with the database 402. Registering a user individually can involve adding the user to a tenant identified in the database 402.

When an organization is registered as a tenant, credentials can be stored in the database 402 at the organization level.

Onboarding a user causes creation of an account for the user (individual user or organization) in the database 402. The account includes various information identifying the user, privileges of the user, and so forth, to allow for use of the service controller 202 and management of a cloud service instance. Once the account is established, the user can order provisioning of a cloud service instance to perform a desired service.

In some examples, an administrator can create an account for a tenant, and can then authorize or point to users than can be part of the tenant. Note also that a new user can be created as a tenant or an individual user.

Credentials of accounts for users created as part of onboarding can be at one of several different levels, including Level 1, Level 2, and Level 3, as examples. At Level 1, a credential is provided by a service provider (provider of the service controller 202 and the security service 303) and can be associated with an individual user, who can be billed by the service provider separately for use of the system.

At Level 2, a credential stored in the database 402 is associated at the "customer" level, i.e. with an organization as tenant. Users are associated with the customer. A user of the organization uses the credential of the organization to use the services of the system, and the account of the organization is billed for such use.

At Level 3, a credential is input by the user at the time of ordering a cloud service. This credential is used at runtime, and is not stored in the database 402.

Once a user has been onboarded and an account created for the user, the user can use a service use engine 406 to perform login (also referred to as "sign-on") (410) to the database 402 to authenticate (412) the user. In some examples, an identity management (IDM) token can be provided to the user in response to authentication of the user. The IDM token can refer to any item that is associated with the user and that is used by the system to identify the user as being an authorized user.

The IDM token can be used by the user to access (414) the catalog 308 associated with the service controller 202. The user can order an offering (e.g. cloud service) from the catalog 308. Also using the IDM token, the service controller 202 can make a call (416) to the security service 303, in the manner discussed above.

More generally, following onboarding of an individual user or a tenant and then the tenant's users, a single sign-on with the portal 302 can be performed using identity management or a credential (such as the Level 1, Level 2, or Level 3 credential discussed above) provided by the single sign-on, to allow a user (individual user or user of a tenant) access to the service controller 202 to provision a cloud service instance on the user's behalf, and further to perform lifecycle management of the provisioned cloud service instance.

The onboarding engine 404 and the service use engine 406 can be implemented as a combination of hardware and machine-readable instructions executable on the hardware.

In some implementations, a user can set up multiple accounts, such as a personal account and a work account. Different cloud services and/or different security policies (or policies relating to other compliance tasks and/or monitoring tasks) can be presented to the user depending upon which account the user is using when accessing the system.

In other example use cases, a system including a service controller (e.g. 202 discussed above) and a service (e.g. compliance/monitoring service 206 discussed above) that can be invoked by the service controller can be used in the context of application release management. A developer of an application can use the service controller to develop the application, and can test an instance (i.e. a current version) of the application using the compliance/monitoring service. The release of the application can occur in multiple release stages, such as a development stage, a test stage, a pre-production stage, and a production stage. At each stage, a common profile (e.g. a security profile) can be used and automatically enforced. In this way, the developer can automatically protect the application being deployed without having to be fully knowledgeable about how the application is to be protected.

Figure 5:
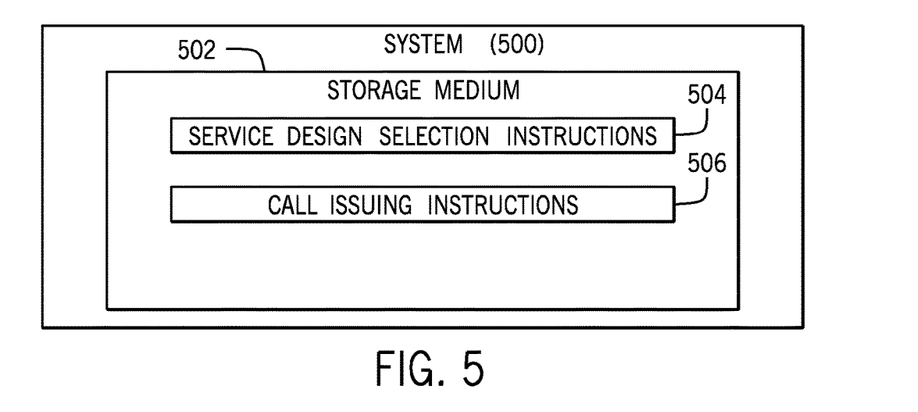
FIG. 5 is a block diagram of an example computer system, according to some implementations.

FIG. 5 is a block diagram of a computer system 500 that includes a non-transitory machine-readable or computer-readable storage medium (or storage media) 502 that stores machine-readable instructions executable by a processor (or multiple processors) to perform various processes, including any or some combination of those discussed above. A processor can include a microprocessor, a microcontroller, a physical processor module or subsystem, a programmable integrated circuit, a programmable gate array, or another physical control or computing device.

The machine-readable instructions stored in the storage medium (or storage media) 502 can service design selection instructions 504 to receive selection of a service design, where the selection is one of a user selection of the service design from a catalog or selection using a call to an application programming interface (API) from a catalog. The service design is associated with a service controller that performs one of provisioning and lifecycle management of an instance of a cloud service, the service design including a call to be issued by the service controller to a compliance/monitoring service. The machine-readable instructions further include call issuing instructions 506 to issue, by the service controller, the call to the compliance/monitoring service.

The storage medium (or storage media) 502 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
provisioning, by a service controller, an instance of a cloud service in response to receiving a request, wherein the service controller is provided with a sequence of machine-readable instructions to process represented as content, and the content including a call that is invoked by the service controller when the sequence of machine-readable instructions is processed, causing an invocation of a compliance/monitoring service, wherein the service controller is not designed to use the compliance/monitoring service when processing the call from the sequence of machine-readable instructions, and wherein the compliance/monitoring service when invoked by the service controller performs a task selected from among monitoring the provisioned instance and determining compliance of the provisioned instance; and
issuing, by the service controller, the call to the compliance/monitoring service based on processing the sequence of machine-readable instructions having the call, the call comprising information regarding the provisioned instance, wherein the information is processed by the compliance/monitoring service in performing the task.

2. The method of claim 1, further comprising:
performing, by the service controller, lifecycle management of the instance of the cloud service.

3. The method of claim 1, further comprising:
in response to the issued call, using, by the compliance/monitoring service, the information in performing the task, wherein the task comprises an action selected from among initiating the provisioned instance, interacting with the provisioned instance, updating the provisioned instance, performing remediation with respect to an issue, sending a notification of the issue, and providing a report with respect to the issue.

4. The method of claim 1, wherein the task performed by the compliance/monitoring service in response to the issued call comprises checking whether the provisioned instance is compliant with one of a security profile and a security level, and wherein the information of the call further includes the one of the security profile and security level.

5. The method of claim 1, wherein the task performed by the compliance/monitoring service in response to the issued call comprises monitoring an operation of the provisioned instance.

6. The method of claim 1, further comprising:
in response to detecting an issue, perform at least one of:
remediating the issue by interacting with the provisioned instance,
remediating the issue by invoking a lifecycle management action,
sending a notification of the issue, and
sending a report relating to the issue.

7. The method of claim 1, wherein the information describes a topology of the instance of the cloud service or a node of the instance of the cloud service, and information about relationships between neighboring nodes in the instance of the cloud service.

8. The method of claim 1, wherein the information is selected from among addresses of nodes in the instance of the cloud service, ports of nodes in the instance of the cloud service, a topology of the instance of the cloud service, information relating to an operating system used by the instance of the cloud service, information of a type of node in the instance of the cloud service, information relating to virtual machines of the instance of the cloud service, a security level of the instance of the cloud service, a key used to access data, a tenant identifier and a credential to allow for monitoring and remediation on behalf of a tenant, and a profile specifying a policy or level associated with the task.

9. The method of claim 1, further comprising:
onboarding an individual user or a tenant including users; and
performing sign-on for a given user to allow the given user access to the service controller for provisioning the instance of the cloud service on behalf of the given user and management of the instance of the cloud service, the given user being one of the individual user and a user of the tenant.

10. The method of claim 9, further comprising:
using one of a credential provided by a service provider, a credential of the tenant, and a credential input by the given user at sign-on to provide access to the service controller.

11. A system comprising:
a processor configured to execute instructions representing a service controller, wherein the service controller configured to provision an instance of a cloud service in response to receiving a request;
at least one of: the processor and a different processor configured to execute service instructions representing a compliance/monitoring service, wherein the compliance/monitoring service configured to perform a task to one or more of: monitor the provisioned instance, and determine compliance of the provisioned instance; and
a non-transitory computer-readable medium configured to house sequences of machine-readable instructions and information as a service design of the service controller, the sequence of machine-readable instructions including a call that when processed by the service controller invokes the compliance/monitoring service for processing, wherein the service controller is not designed to use the compliance/monitoring service when the service controller processes the call from the sequence of machine-readable instructions,
the service controller further configured to issue the call to the compliance/monitoring service in response to a provisioning of the instance of the cloud service based on the sequences of machine-readable instructions being processed by the service controller, the call comprising at least a portion of the information relating to the provisioned instance of the cloud service, and
the compliance/monitoring service further configured to process the information in performing the task.

12. The system of claim 11, wherein the call was added to the service design to allow the compliance/monitoring service to be invoked by the service controller when the service controller processes the sequences of machine-readable instructions.

13. The system of claim 11, further comprising a portal accessible by a user to cause submission of the request.

14. The system of claim 11, wherein at least one portion of the information comprises a profile to specify a policy or level associated with the task, the profile selected from among:
a profile selected by the user from a plurality of profiles presented to the user,
a profile predefined in the service design, a profile predefined in a catalog that includes information about cloud services that can be ordered by the user, and a profile passed with an application programming interface (API) call associated with the provisioning of the cloud service instance.

15. An article comprising at least one non-transitory machine-readable storage medium storing instructions that upon execution cause a system to:

receive selection of a service design, the service design associated with a service controller that performs one of provisioning and lifecycle management of an instance of a cloud service, the service design including a sequence of machine-readable instructions processed by the service controller, and the sequence of machine-readable instructions include a call invoked by the service controller when processing the sequence of machine-readable instructions of the service device and when the call is invoked a compliance/monitoring service is processed that performs a task selected from among monitoring the provisioned instance and determining compliance of the provisioned instance, and wherein the service controller is not designed to use the compliance/monitoring service when processing the call from the sequence of machine-readable instructions; and issue, by the service controller, the call to the compliance/monitoring service based on processing the sequence of machine-readable instructions of the service design, the call comprising information regarding the provisioned instance, wherein the information is useable by the compliance/monitoring service in performing the task.

16. The article of claim 15, wherein the selection is one of a user selection of the service design from a catalog, and selection using a call to an application programming interface (API).

17. The article of claim 16, wherein the catalog further comprises an item corresponding to the cloud service, and the instructions are executable by the system to:

receive an order from a user for the cloud service based on the catalog.

18. The article of claim 15, wherein the information further comprises an identifier of a tenant.

19. The article of claim 15, wherein the information further comprises a profile specifying one of a policy and level to be used in performing the task.

20. The article of claim 19, wherein the profile is selected from among:

a profile selected by the user from a plurality of profiles presented to the user, a profile predefined in the service design, a profile predefined in a catalog that includes information about cloud services that can be ordered by the user, and a profile passed with an application programming interface (API) call associated with provisioning the cloud service instance.

21. The article of claim 15, wherein the information comprises a profile specifying one of a policy and level to be used in performing the task, and wherein the task is part of developing and releasing an application.

* * * * *